US012664849B2

(12) United States Patent
Corvese

(10) Patent No.: US 12,664,849 B2
(45) Date of Patent: Jun. 23, 2026

(54) LOTTERY TICKET VENDING MACHINE

(71) Applicant: Brightstar Global Solutions Corporation, Providence, RI (US)

(72) Inventor: Robert Corvese, Warwick, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 441 days.

(21) Appl. No.: 18/480,126

(22) Filed: Oct. 3, 2023

(65) Prior Publication Data

US 2025/0111725 A1 Apr. 3, 2025

(51) Int. Cl.

| | |
|---|---|
| ***G07C 15/00*** | (2006.01) |
| ***G07F 9/02*** | (2006.01) |
| ***G07F 17/32*** | (2006.01) |
| ***G07F 17/42*** | (2006.01) |

(52) U.S. Cl.

CPC ........... *G07C 15/005* (2013.01); *G07F 9/026* (2013.01); *G07F 17/329* (2013.01); *G07F 17/42* (2013.01)

(58) Field of Classification Search

CPC .... G06Q 10/087; G07C 15/005; G07F 9/026; G07F 11/045; G07F 9/10; G07F 11/165; G07F 11/68; G07F 17/329; G07F 17/42

See application file for complete search history.

(56) References Cited

U.S. PATENT DOCUMENTS

| | | | |
|---|---|---|---|
| 3,855,457 A | 12/1974 | Amundson et al. | |
| 5,160,076 A * | 11/1992 | Ford | G07F 17/42 225/4 |
| 5,222,624 A | 6/1993 | Burr | |
| 5,408,417 A | 4/1995 | Wilder | |
| 5,836,498 A | 11/1998 | Turek | |
| 5,943,241 A * | 8/1999 | Nichols | G06Q 20/202 700/232 |
| 6,609,644 B1 | 8/2003 | Menna | |
| 6,712,253 B2 | 3/2004 | Hargrave et al. | |
| 6,714,838 B2 | 3/2004 | Scrymgeour et al. | |
| 6,726,077 B2 | 4/2004 | Roberts et al. | |
| 7,032,774 B2 | 4/2006 | Boehm et al. | |
| 7,383,099 B2 | 6/2008 | Pollard et al. | |
| 7,562,798 B2 | 7/2009 | Bartolone et al. | |
| 7,665,394 B2 | 2/2010 | Roberts et al. | |
| 7,850,257 B2 | 12/2010 | Roberts et al. | |
| 8,127,973 B2 | 3/2012 | Mirkovic et al. | |
| 8,192,268 B1 | 6/2012 | Karpe | |
| 8,210,921 B1 | 7/2012 | Karpe | |
| 8,534,524 B2 | 9/2013 | Businger et al. | |
| 8,550,294 B2 | 10/2013 | Martin | |

(Continued)

FOREIGN PATENT DOCUMENTS

CN 116206396 A * 6/2023 ........... G07C 15/005

OTHER PUBLICATIONS

"Extended European Search Report", from corresponding European Patent Application No. 24201302.7, Feb. 26, 2025.

*Primary Examiner* — Jacob S. Scott
*Assistant Examiner* — Temesgen M. Maru
(74) *Attorney, Agent, or Firm* — Neal, Gerber & Eisenberg LLP

(57) ABSTRACT

A lottery ticket vending machine configured to determine the lottery ticket state for each of a plurality of ticket drawers of the lottery ticket vending machine and, for each of the ticket drawers display an indication of the lottery ticket state for that ticket drawer of the lottery ticket vending machine.

20 Claims, 12 Drawing Sheets

(56) References Cited

U.S. PATENT DOCUMENTS

| | | | | |
|---|---|---|---|---|
| 9,339,121 | B2 * | 5/2016 | Siciliano | A47F 1/125 |
| 9,613,337 | B1 | 4/2017 | Garrison | |
| 9,685,026 | B1 | 6/2017 | Garrison | |
| 10,438,452 | B2 | 10/2019 | Ferron et al. | |
| 11,010,987 | B2 | 5/2021 | Bucci | |
| 2003/0120381 | A1 | 6/2003 | Perin et al. | |
| 2004/0000572 | A1 | 1/2004 | Engelhardt, Jr. et al. | |
| 2005/0178810 | A1 | 8/2005 | Woods et al. | |
| 2007/0017978 | A1 | 1/2007 | Ho | |
| 2007/0088459 | A1 | 4/2007 | Pollard et al. | |
| 2010/0308071 | A1 | 12/2010 | Businger | |
| 2011/0042403 | A1 * | 2/2011 | Martin | B65H 5/04 221/124 |
| 2014/0008407 | A1 | 1/2014 | Bucci et al. | |
| 2014/0046481 | A1 | 2/2014 | Siciliano et al. | |
| 2016/0232741 | A1 | 8/2016 | Assis et al. | |
| 2017/0004671 | A1 | 1/2017 | Connolly et al. | |
| 2018/0186557 | A1 * | 7/2018 | Ghia | B65D 83/12 |
| 2018/0190073 | A1 * | 7/2018 | Ghia | G07F 17/3253 |
| 2022/0108562 | A1 * | 4/2022 | Claude | G07F 17/329 |
| 2022/0114842 | A1 | 4/2022 | Mejenborg et al. | |
| 2022/0114860 | A1 | 4/2022 | Mejenborg et al. | |
| 2024/0021054 | A1 | 1/2024 | Topalian et al. | |

* cited by examiner

LOTTERY TICKET VENDING MACHINE

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a housing; a plurality of ticket drawers in the housing, the ticket drawers each configured to hold lottery tickets; a ticket burster in the housing, the ticket burster defining a ticket inlet and a ticket outlet, the ticket burster movable to positions respectively associated with the ticket drawers; and a controller. The controller is configured to: for each of the ticket drawers, track a quantity of lottery tickets in that ticket drawer, for each of the ticket drawers, track an event associated with the lottery tickets in that ticket drawer, and for each of the ticket drawers, cause a display by a lottery ticket state indicator of an indication of a lottery ticket state for that ticket drawer.

In various other embodiments, the present disclosure relates to a lottery ticket vending machine including: a housing; a display device supported by the housing; a plurality of ticket drawers in the housing, the ticket drawers each configured to hold lottery tickets; a ticket burster in the housing, the ticket burster defining a ticket inlet and a ticket outlet, the ticket burster movable to positions respectively associated with the ticket drawers; and a controller. The controller is configured to: for each of the ticket drawers, track a quantity of lottery tickets in that ticket drawer, for each of the ticket drawers, track an event associated with the lottery tickets in that ticket drawer, and for each of the ticket drawers, cause a display, by the display device, of an indication of a lottery ticket state for that ticket drawer.

In various other embodiments, the present disclosure relates to a lottery ticket vending machine including: a housing; a display device supported by the housing; a plurality of ticket drawers in the housing, the ticket drawers each configured to hold lottery tickets; a ticket burster in the housing, the ticket burster defining a ticket inlet and a ticket outlet, the ticket burster movable to positions respectively associated with the ticket drawers; and a controller. The controller is configured to: for each of the ticket drawers, receive data regarding a quantity of lottery tickets in that ticket drawer, and for each of the ticket drawers, cause a display, by the display device, of one of an empty lottery ticket state indication, a low lottery ticket state indication, a full lottery ticket state indication, a discontinued lottery ticket state indication, and a jammed lottery ticket state indication.

Additional features are described in, and will be apparent from, the following Detailed Description and the figures.

DETAILED DESCRIPTION

Figure 1:
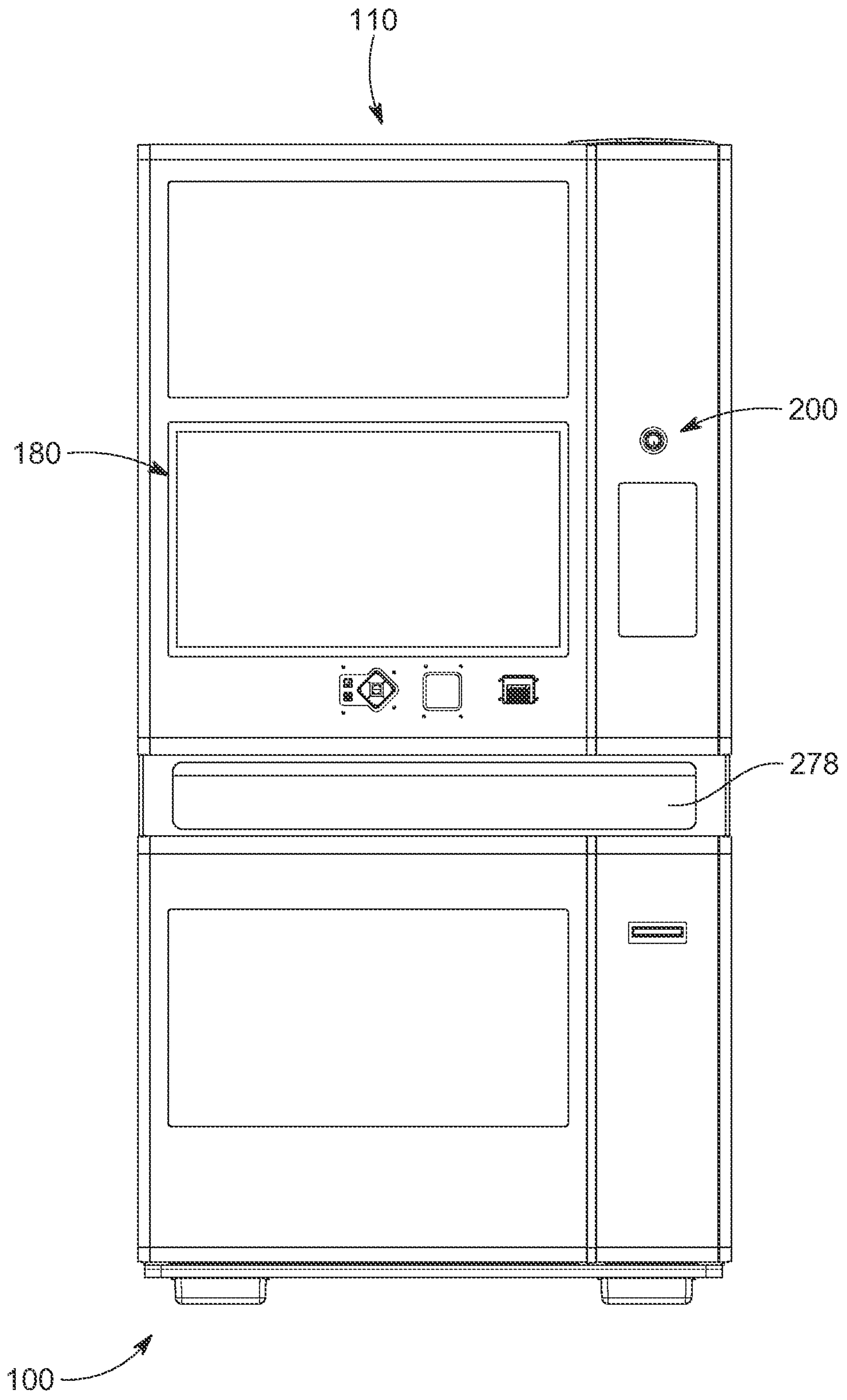
FIG. 1 is a front perspective view of a lottery ticket vending machine of one example embodiment of the present disclosure shown with a front door thereof in a closed position.

In various embodiments, the present disclosure relates to a lottery ticket vending machine that is configured to: (1) determine the lottery ticket state for each of a plurality of ticket drawers of the lottery ticket vending machine; and (2) display one or more indications of the lottery ticket state for each of a plurality of ticket drawers of the lottery ticket vending machine.

In various embodiments, the lottery ticket vending machine includes only one lottery ticket state indicator that is configured to display the lottery ticket states for each of the ticket drawers (simultaneously or sequentially). In various such embodiments, the lottery ticket vending machine includes only one lottery ticket state indicator for each of the ticket drawers.

In various embodiments, the lottery ticket vending machine includes multiple lottery ticket state indicators that are respectively configured to display the respective lottery ticket states for each of the ticket drawers (simultaneously or sequentially) of each of the drawer columns (such as a separate lottery ticket state indicator for each drawer column). In various such embodiments, the lottery ticket vending machine includes one lottery ticket state indicator for each of the ticket drawer columns. In various such embodiments, the lottery ticket vending machine includes the lottery ticket state indicators for each of the ticket drawer columns adjacent to that respective ticket drawer column.

In various embodiments, the lottery ticket vending machine includes multiple lottery ticket state indicators that are respectively configured to display the lottery ticket states for each of the ticket drawers (such as a separate lottery ticket state indicator for each ticket drawer). In various such embodiments, the lottery ticket vending machine includes one lottery ticket state indicator for each of the ticket drawers. In various such embodiments, the lottery ticket vending machine includes the lottery ticket state indicators for each of the ticket drawers on the respective ticket drawers. In various such embodiments, the lottery ticket vending machine includes the lottery ticket state indicators for each of the ticket drawers adjacent to the respective ticket drawers.

In various embodiments, the lottery ticket vending machine includes a lottery ticket state indicator on each of the bursters associated with the ticket drawers and/or ticket drawer columns.

In various embodiments, the lottery ticket vending machine includes a lottery ticket state indicator for each of the ticket drawers on one or more display devices that are separate from the lottery ticket drawers and ticket drawer columns.

In various embodiments, each of the lottery ticket state indicators includes only one state indicator (such as one light) that is configured to indicate each of the multiple different states of the respective ticket drawer.

In various embodiments, each of the lottery ticket state indicators includes multiple state indicators (such as multiple lights) that are configured to respectively indicate each of the multiple different states of the respective ticket drawer.

In various embodiments, the lottery ticket state indicators are viewable without opening the door of the lottery ticket vending machine.

In various embodiments, the lottery ticket state indicators are viewable after opening the door of the lottery ticket vending machine.

In various embodiments, each of the ticket bursters of the lottery ticket vending machine includes a sensor configured to be aligned with each ticket drawer of a drawer column (that the ticket burster is associated with) to sense an indication provided by a ticket level determination assembly for that ticket drawer to at least partially determine or verify the lottery ticket state of that ticket drawer.

In various embodiments, the controller(s) of the lottery ticket vending machine track(s): (1) the quantity of tickets in each ticket drawer; (2) the lottery games of the lottery tickets in each ticket drawer for relevant lottery ticket events (such as a discontinuation of a lottery game); and (3) any other events (such as jams) associated with each of the ticket drawers, and controls the lottery ticket state indicators for each ticket drawer based on such information. Additionally, in various embodiments, the controller(s) is/are configured to receive and use data from the sensors (such as sensors on the bursters) that provide information regarding the lottery tickets in each of the ticket drawers to determine and/or verify the lottery ticket state for each ticket drawer.

In various embodiments, the lottery ticket state of each ticket drawer is one of the following different states: (1) empty; (2) low; (3) full; (4) lottery game discontinued; and (5) jammed; and the lottery ticket state indicator associated with that ticket drawer is configured to indicate each of those different states as appropriate for that ticket drawer.

The lottery ticket state indicators make it easier and quicker for an operator to service the lottery ticket vending machine such as but not limited to easier and quicker to refill empty or low ticket drawers, fix jammed ticket drawers, and remove and replace lottery tickets for discontinued lottery games from ticket drawers. The lottery ticket state indicators also save the operator time in not having to open and check ticket drawers that are indicated to be full.

For a better understanding of the present disclosure, example instant lottery tickets are first generally described herein.

Various known instant lottery tickets are single game instant lottery tickets. An example single game instant lottery ticket can include: (1) a ticket substrate having a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Instant lottery tickets can also be of the known pull tab type. Various known instant lottery tickets are multi-game instant lottery tickets and can be larger than single game instant lottery tickets. Various known instant lottery tickets have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or lottery ticket retailers, and activation. An instant lottery ticket pack can include a plurality of lottery tickets that are all of the same type, same size, and for the same game. Each instant lottery ticket pack can be protected for storage and shipping by a transparent pack wrapping, such as transparent plastic wrapping, securely wrapped around the plurality of lottery tickets. A pack of instant lottery tickets can include all of the instant lottery tickets attached to each other but joined by perforations. Such lottery tickets of a pack can be detached from each other along such perforations. While the lottery tickets of each pack are often manufactured in a continuous strip that is fan-folded for convenient supply, the packs can be in other forms such as in a roll form. These packs in the fan-folded form or in the roll form are configured for dispensing via a lottery ticket vending machine.

Figure 10:
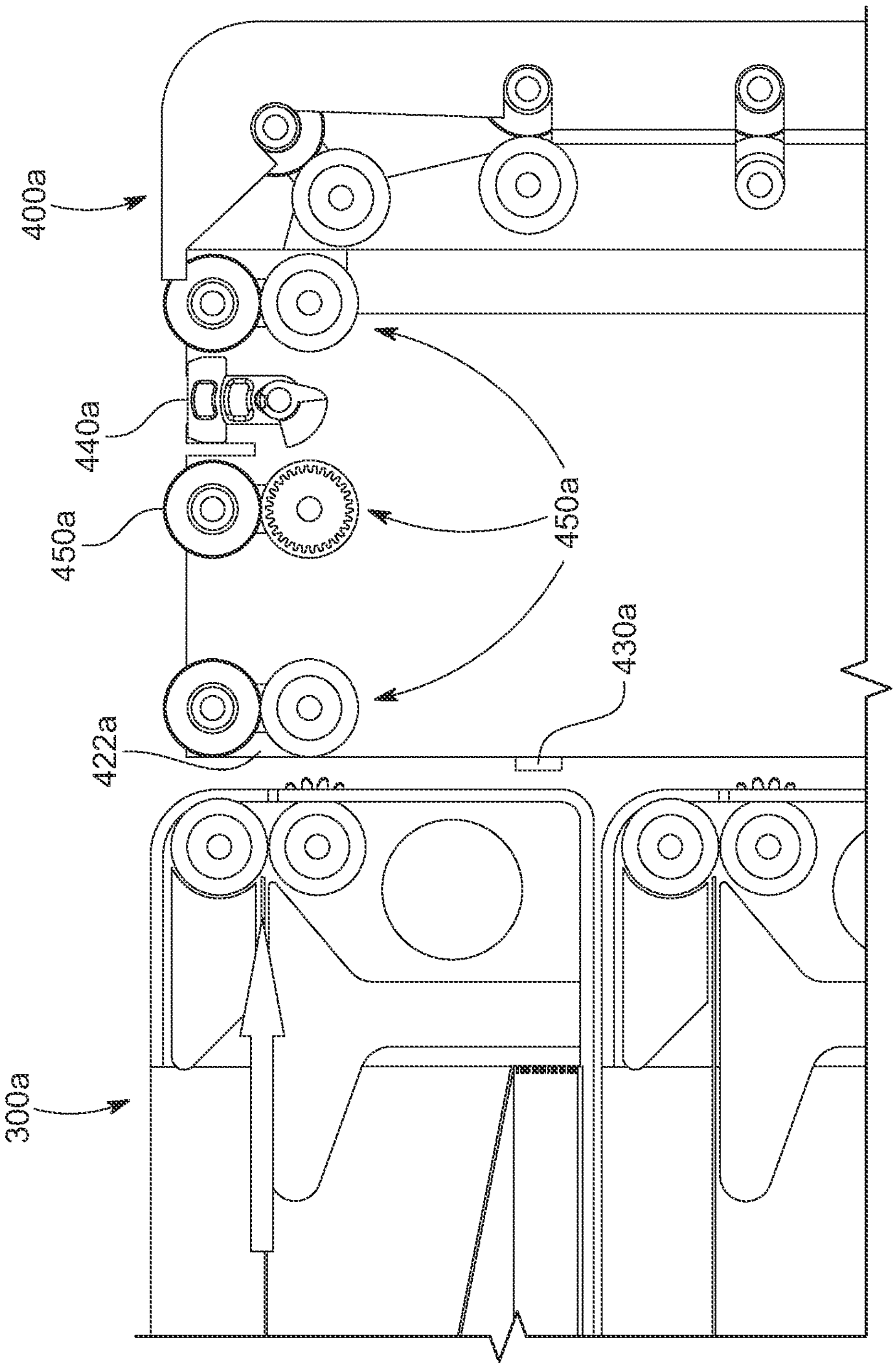
FIG. 10 is a further enlarged perspective view of part of the ticket drawer column of FIG. 4, and the burster of FIG. 5 aligned with one of the ticket drawers thereof.
Figure 11:
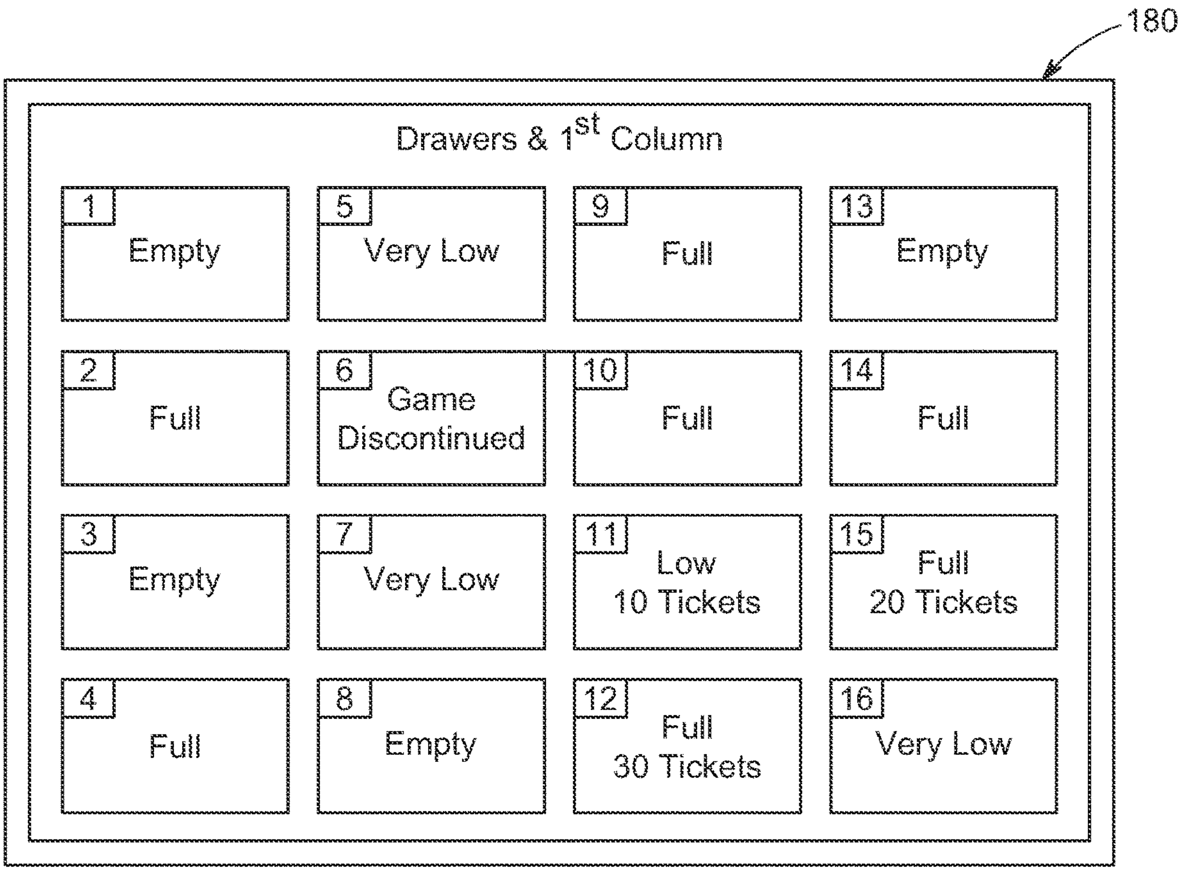
FIG. 11 illustrates an example interface displayable by a display device of the lottery ticket vending machine of FIG. 1, and providing the lottery ticket state indicator in accordance with another example embodiment of the present disclosure.

FIGS. 1 to 10 illustrate a lottery ticket vending machine 100 of one example embodiment of the present disclosure. The lottery ticket vending machine 100 may be referred to herein as the "ticket vending machine" or the "vending machine" for brevity. FIG. 11 illustrates an example interface displayable by a display device of the lottery ticket vending machine 100 and configured to display lottery ticket state indicators for each of the lottery ticket drawers such as described below.

The illustrated example ticket vending machine 100 includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. Bursting of the lottery ticket is the industry term for separating a lottery ticket from a pack of lottery tickets held in a ticket drawer. In the example embodiments described herein, the ticket drawers of the ticket drawer columns do not burst the lottery tickets and do not need any mechanisms for bursting the lottery tickets, but rather each of the moveable ticket bursters bursts the lottery tickets moved into that ticket burster as further explained below. The front door 200 includes a ticket collection receptacle 250 configured to receive separated lottery tickets from each of the ticket bursters 400*a*, 400*b*, and 400*c*. The quantity, positions, sizes, and configurations of the ticket drawer columns, ticket drawers, and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form of a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the determination of tickets in the ticket drawers and the dispensing of each requested lottery ticket from those ticket drawers. The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices (such as display device 180), one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
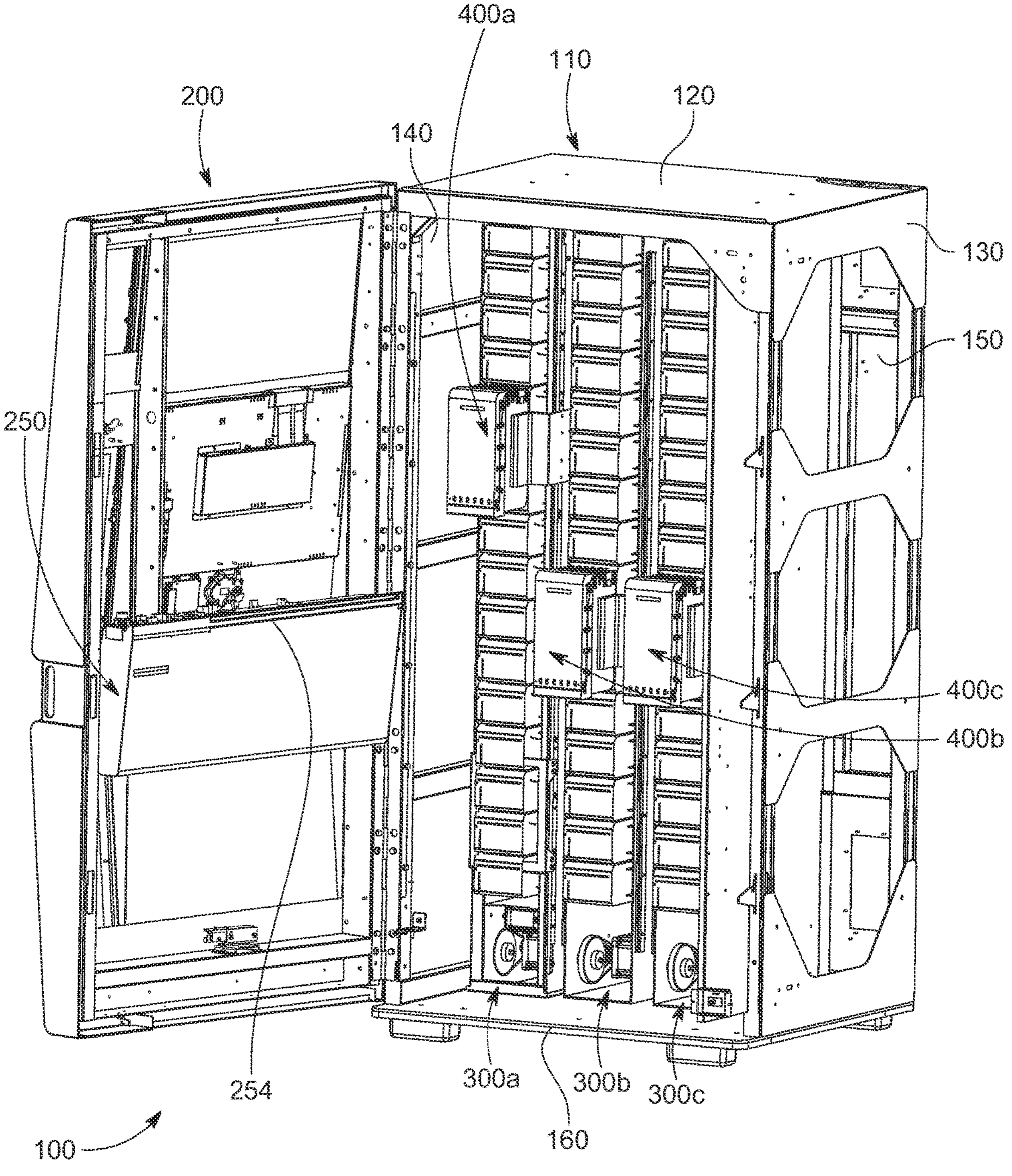
FIG. 2 is a front perspective view of the lottery ticket vending machine of FIG. 1 shown with the front door thereof in an open position, shown with a left side wall panel thereof removed, showing three ticket drawer columns and three movable ticket bursters respectively associated the three ticket drawer columns, and showing a ticket collection receptacle of the front door.
Figure 3:
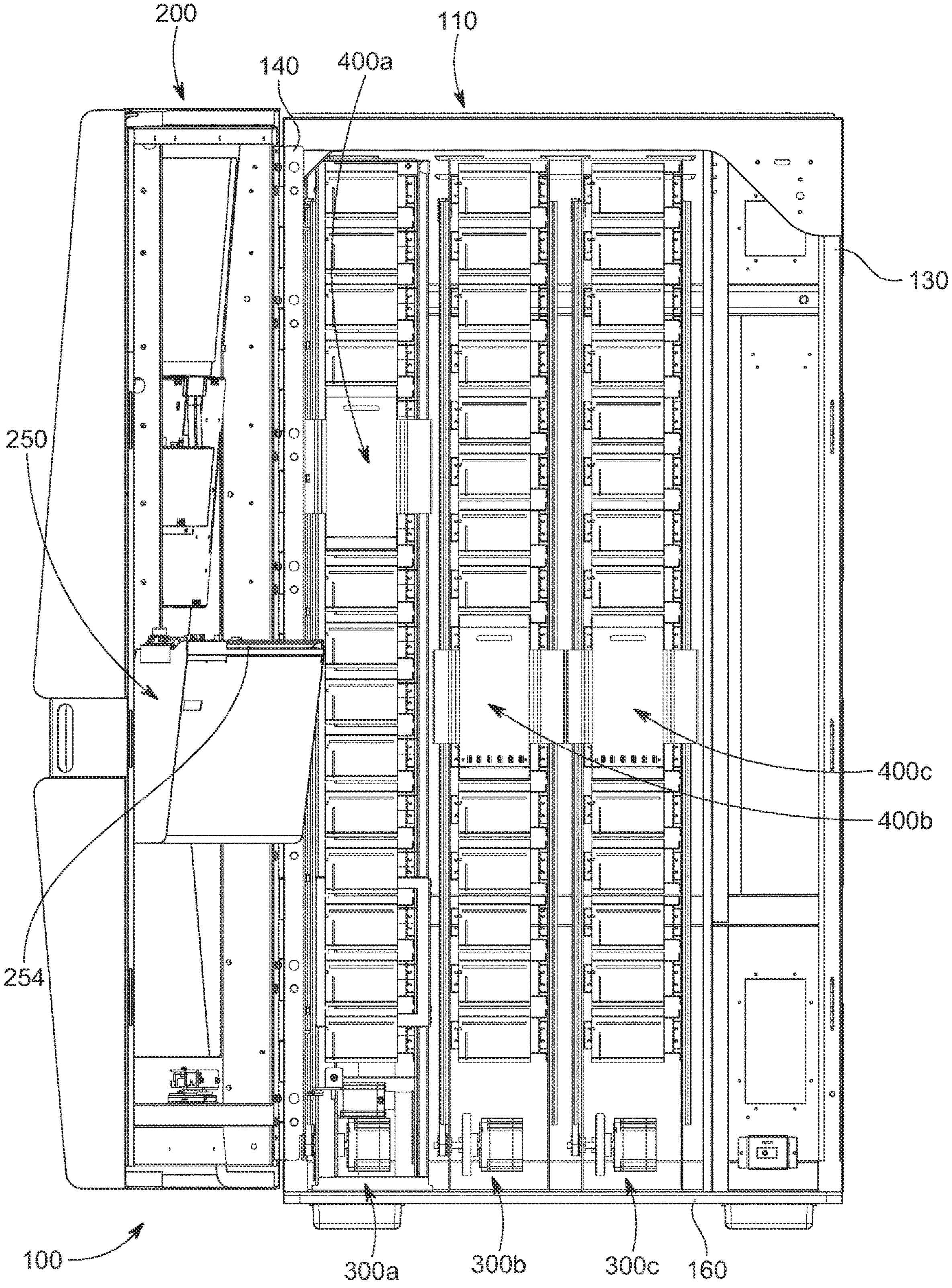
FIG. 3 is a front view of the lottery ticket vending machine of FIG. 1 shown with the front door thereof in the open position, shown with the left side wall panel thereof removed, showing the three ticket drawer columns and the three movable ticket bursters respectively associated the three ticket drawer columns, and showing the ticket collection receptacle of the front door.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300*a*, 300*b*, and 300*c*. The front door 200 is moveable from a closed and locked position covering the open front face of the machine housing 110 as shown in FIG. 1 to an open position allowing access to the interior of the machine housing 110 as shown in FIGS. 2 and 3. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 2 and 3). The ticket collection receptacle 250 and the front door define an elongated horizontally extending ticket retrieval slot 278 (seen in FIG. 1). The ticket retrieval slot 278 is (and needs to be) large enough so that a purchaser can insert the purchaser's hand through the ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300*a*, 300*b*, or 300*c*. The position, size, and configuration of the ticket collection receptacle can vary in accordance with the present disclosure.

Each of the ticket drawer columns 300*a*, 300*b*, and 300*c* are identical in this example embodiment. For brevity, only ticket drawer column 300*a* is described in detail herein.

Likewise, the three movable ticket bursters 400*a*, 400*b*, and 400*c* are identical in this example embodiment. Likewise, each of the ticket drawers is identical in this example embodiment. For brevity, only ticket burster 400*a* associated with the ticket drawer column 300*a* is described herein and only one of the ticket drawers is described herein.

Ticket drawer column 300*a* includes a series of aligned ticket drawers (not individually labeled except drawer 350) that are vertically stacked in the column. Each of the ticket drawers is configured to hold one or more packs of lottery tickets such as instant lottery tickets for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. As further described below, each ticket drawer is configured to hold lottery tickets (such as instant lottery tickets) for selection by the purchasers. In various embodiments, the different ticket drawers can hold different lottery ticket packs for different lottery games, but it should be appreciated, that two or more ticket drawers can hold the same type of lottery tickets.

In various embodiments, the lottery tickets in each of the ticket drawers of the ticket drawer column 300*a* are movable into the associated ticket burster 400*a* after the ticket burster 400*a* is moved into alignment with such ticket drawer for receipt, bursting, and dispensing of that lottery ticket (such as shown in FIGS. 4, 5, 9, and 10).

In this example embodiment, each of the ticket drawers of each of the ticket drawer columns includes or is associated with a ticket drawer movement assembly. In this example embodiment, the ticket drawer movement assemblies are identical so only ticket drawer movement assembly 360 is described herein for brevity.

Figure 6:
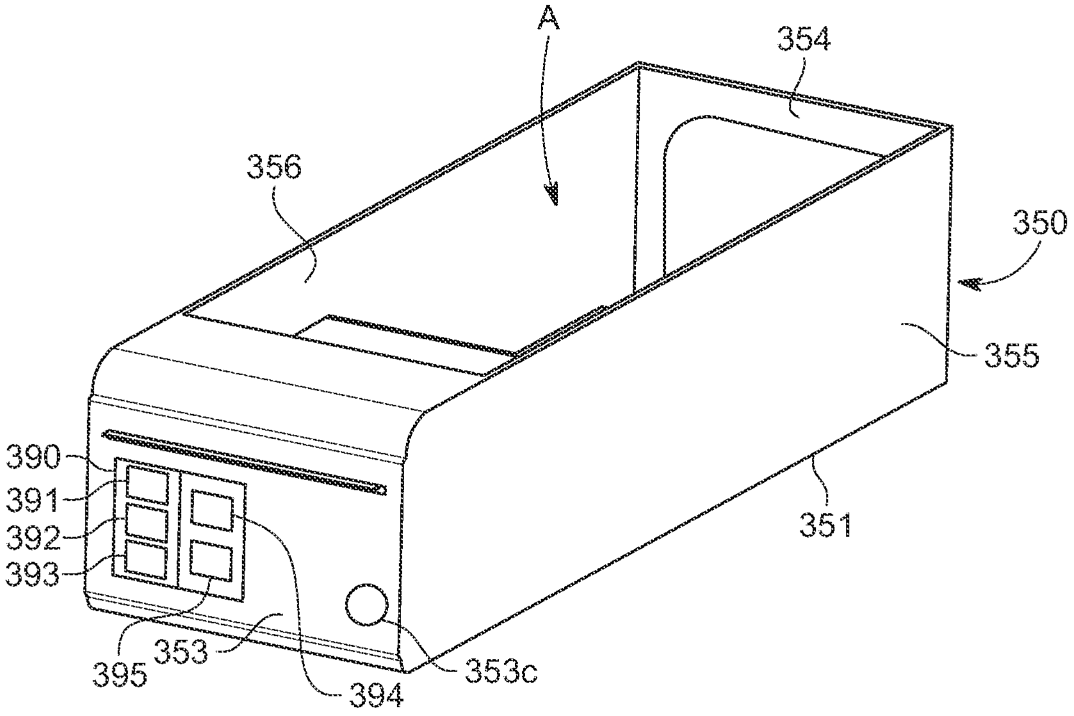
FIG. 6 is an enlarged front perspective view of one of the ticket drawers of the ticket drawer column of FIG. 4, and showing different lottery ticket state indicators in accordance with one example embodiment of the present disclosure.
Figure 7:
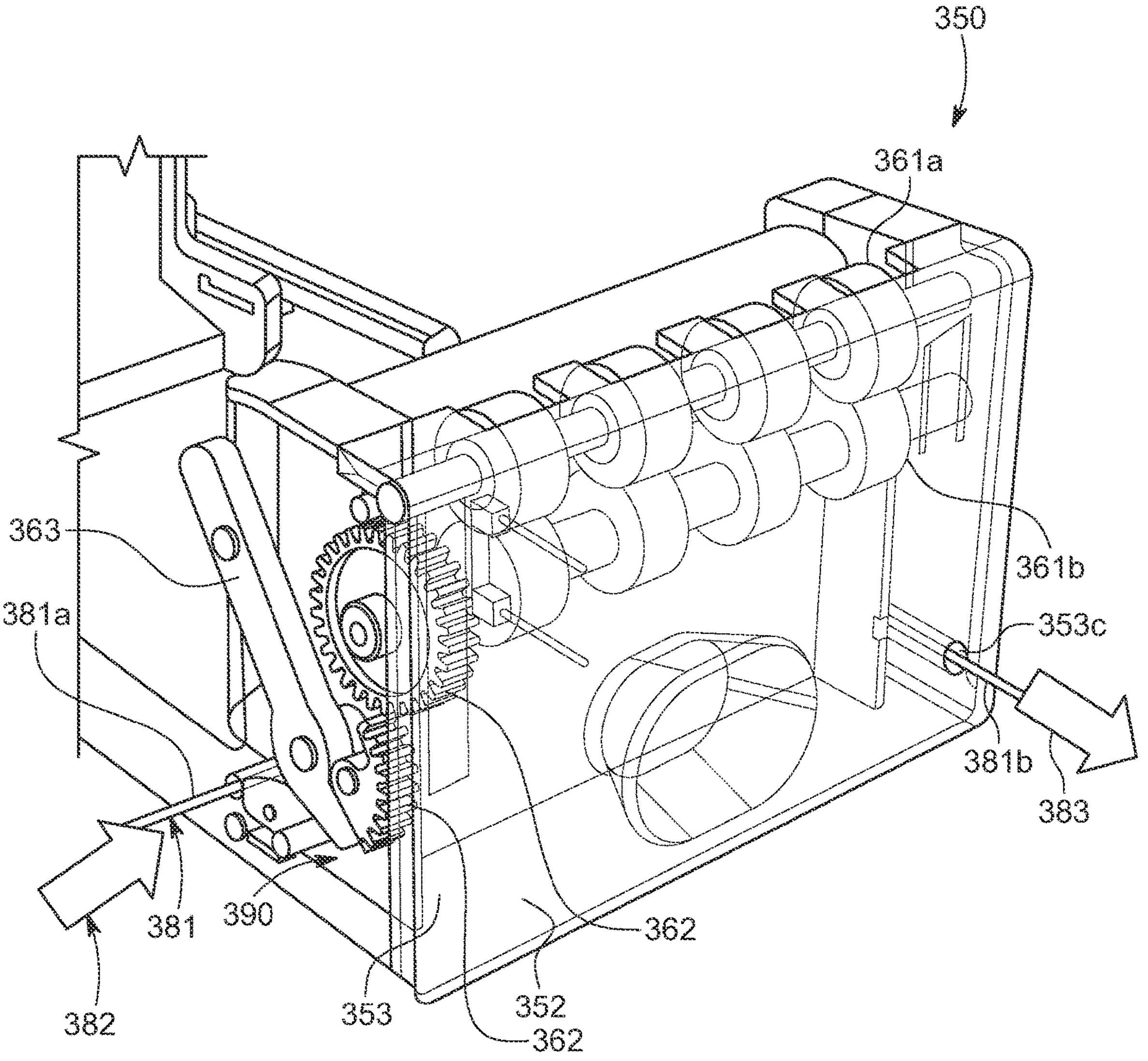
FIG. 7 is an enlarged fragmentary front perspective view of one of the ticket drawers of the ticket drawer column of FIG. 4 showing certain internal components thereof.
Figure 8:
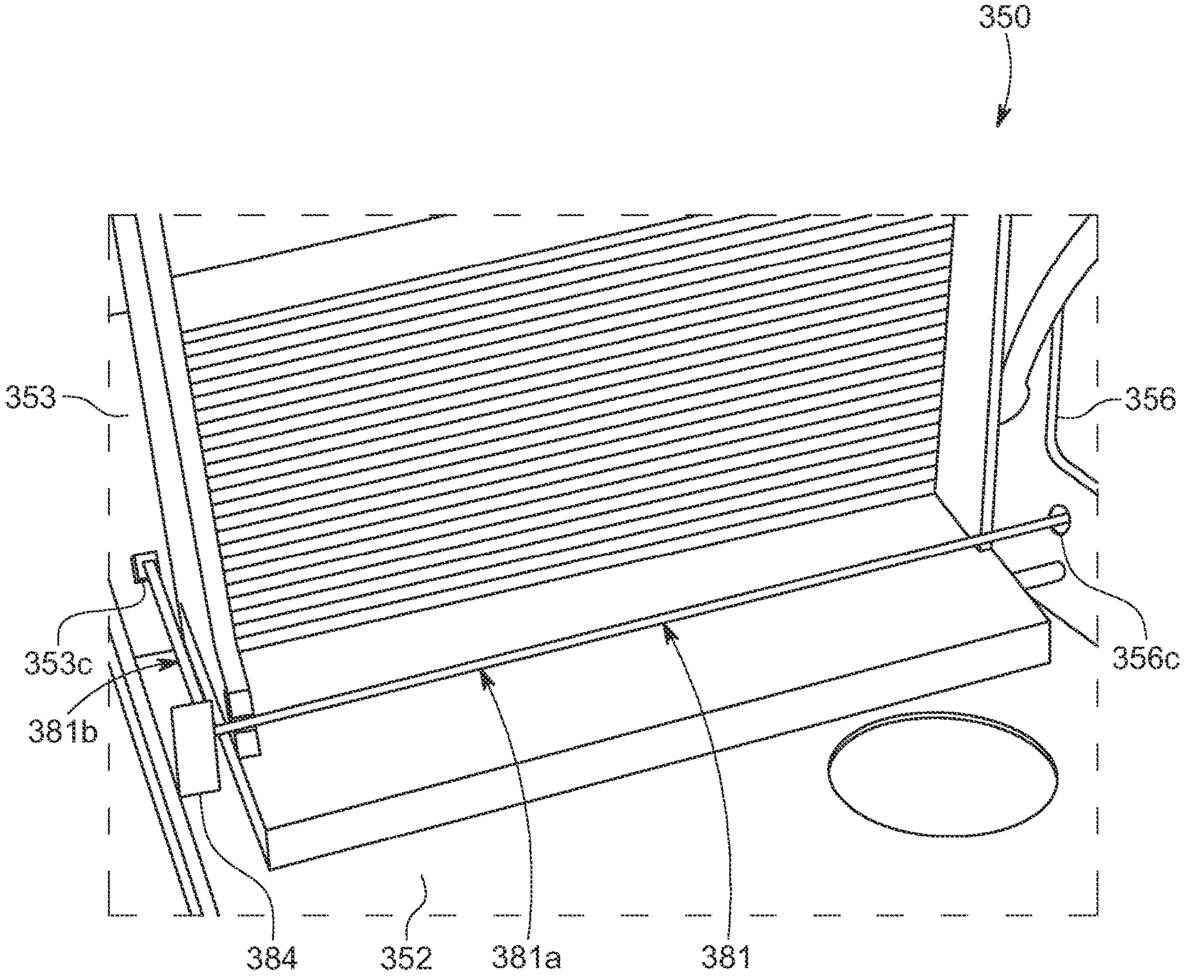
FIG. 8 is an enlarged fragmentary rear perspective view of one of the ticket drawers of the ticket drawer column of FIG. 4 showing certain internal components thereof.
Figure 9:
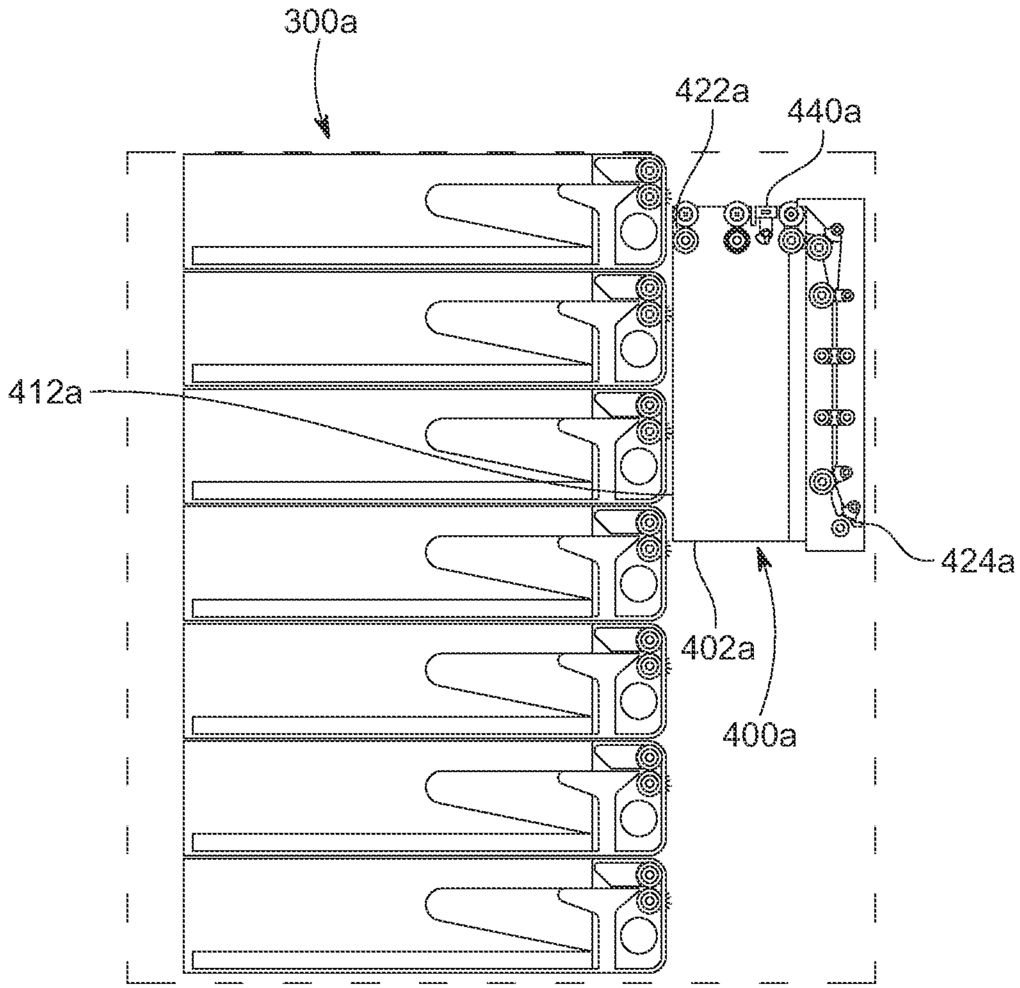
FIG. 9 is an enlarged side view of part of the ticket drawer column of FIG. 4, and the burster of FIG. 4 aligned with one of the ticket drawers thereof.

More specifically, as illustrated in FIGS. 6, 7, and 8, the example ticket drawer 350 includes a drawer housing 351 configured to hold one or more packs of lottery tickets, and thus a quantity of lottery tickets. The housing 351 includes a bottom wall 352, a front wall 353 connected to and extending upwardly from the bottom wall 353, a rear wall 354 connected to and extending upwardly from the bottom wall 353, a first side wall 355 connected to and extending upwardly from the bottom wall 353, a second side wall 356 connected to and extending upwardly from the bottom wall 353, and a partial top wall (not labeled) connected to the front wall 353, the first side wall 355, and the second side wall 356. The front wall 353 is connected to the first side wall 355 and the second side wall 356, and the rear wall 354 is also connected to the first side wall 355 and the second side wall 356. The front wall 353 is spaced-apart from the rear wall 354, and the first side wall 355 is spaced-apart from the second side wall 356, such that the bottom wall 352, the front wall 353, the rear wall 354, the first side wall 355, and the second side wall 356 define an interior ticket pack receipt and holding area A for the ticket drawer 350 that is configured to hold a plurality of lottery tickets of one or more packs. The housing 351 can also include one or more interior structures (not labeled). The housing 351 also includes light beam channels for the purposes discussed below, and specifically, the second side wall 356 of the housing 351 defines a first light beam channel 356*c* and the front wall 353 of the housing 351 defines a second light beam channel 353*c*.

The ticket drawer movement assembly 360 of the ticket drawer 350 is configured to move the leading lottery ticket in the ticket drawer 350 at least partially into the respective burster (such as burster 400*a*) when that burster is aligned with that ticket drawer 350 so that the ticket engagers of the burster can grip and then subsequently move that lottery ticket in that burster. In various embodiments, the burster includes an actuator (not shown) configured to engager an actuation lever of the ticket drawer movement assembly 360 to cause the movement of the leading lottery ticket by the ticket drawer movement assembly 360. In this example embodiment, the ticket drawer movement assembly 360 includes ticket engagers 361*a* and 361*b* (that in this example include rollers (not labeled) mounted on shafts (not labeled)), gearing 362, and an actuation lever 363. The actuation lever 363 is engagable by an actuator (not shown) of the burster 400*a* (after the burster 400*a* is aligned with the ticket drawer 350) to cause the ticket drawer movement assembly 360 to move a leading ticket in the ticket drawer 350 into the burster 400*a*. It should be appreciated that the movement of the lottery tickets into the bursters can be done in multiple different ways in accordance with the present disclosure. As indicated above, one way is for the ticket drawer to have one or more drivable ticket engagers (such as rollers) that are configured to be activated to move each lottery ticket from the ticket drawer into the burster or to retract a lottery ticket from the burster back into the ticket drawer. The activation can be by way of an actuator of the burster or of the ticket drawer in different embodiments. Another one way is for the ticket drawer to have one or more drivable ticket engagers (such as rollers) that are configured to be activated to move each lottery ticket from the ticket drawer into the burster or to retract a lottery ticket from the burster back into the ticket drawer.

Figure 4:
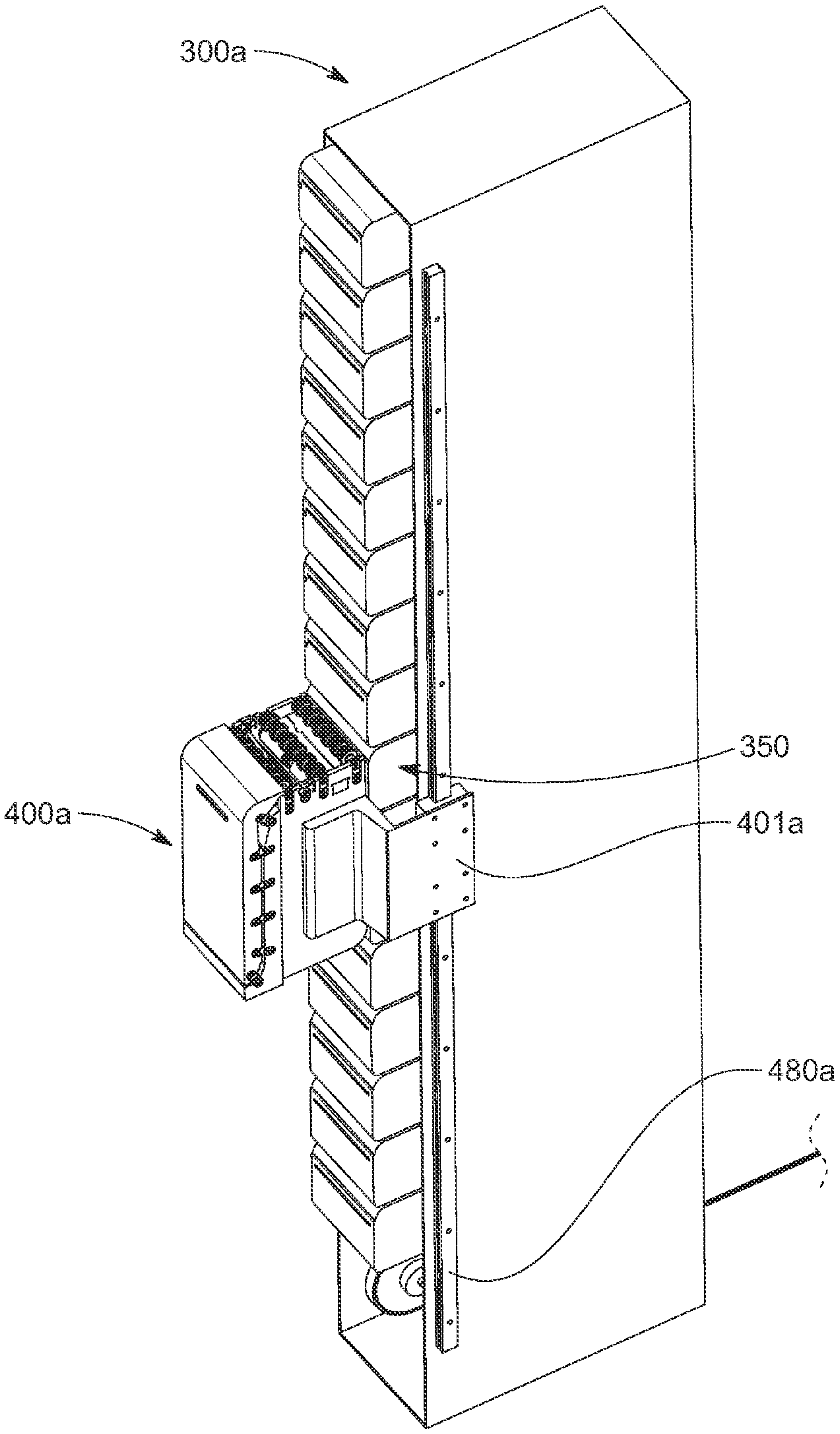
FIG. 4 is an enlarged fragmentary perspective view of one of the ticket drawer columns and the ticket burster associated with that ticket drawer column of the lottery ticket vending machine of FIG. 1.
Figure 5:
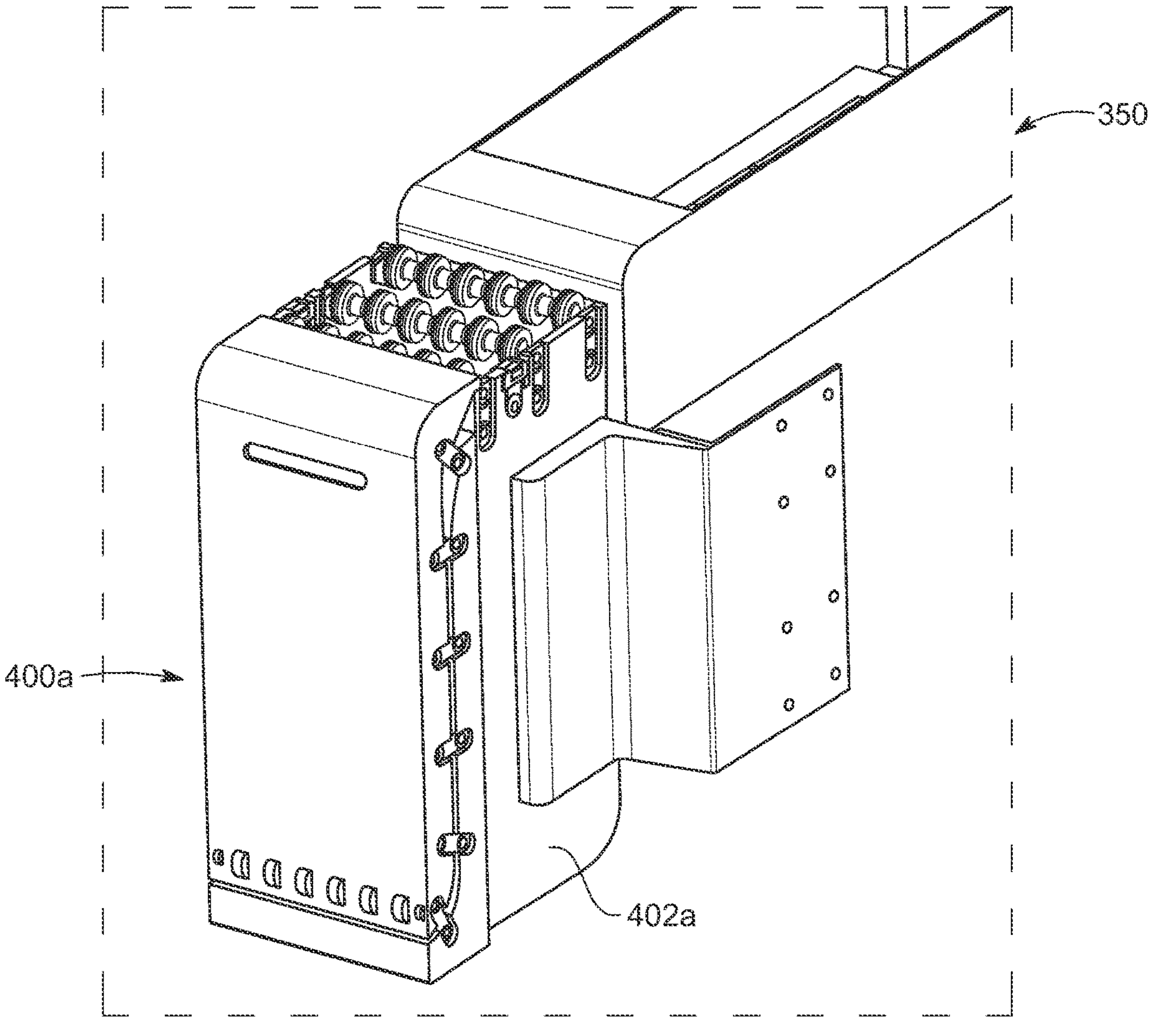
FIG. 5 is an enlarged fragmentary front perspective view of one of the ticket drawers of the ticket drawer column of FIG. 4 and the ticket burster of FIG. 4.

As best shown in FIGS. 4 and 5, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers of the ticket drawer column 300*a*. Each of the burster supporters also support the ticket burster 400*a* in a manner that enables the ticket burster 400*a* to vertically move to into alignment with the ticket receptacle 250.

The ticket vending machine 100 includes one or more actuators (not shown) that control movement of the ticket burster 400*a* under control of the controller of the ticket vending machine 100 and/or the controller of the ticket burster 400*a*. In this example, an actuator (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporters to different vertical locations including a plurality of the locations respectively associated and aligned with each of the ticket drawers of the ticket drawer column 300*a* such that the ticket burster 400*a* is positioned to receive one or more of the lottery tickets stored in each respective ticket drawer of the ticket drawer column 300*a* for obtaining and dispensing that instant lottery ticket into the ticket receptacle 250 for the purchaser as requested by the purchaser.

As best shown in FIGS. 4, 5, 9, and 10, the example movable ticket burster 400*a* generally includes: (a) a burster housing 402*a*; (b) one or more burster supporter connecters (such as burster support connector 401*a* connecting the burster housing 402*a* and the burster supporter 480*a*); (c) a sensor 430*a* supported by the burster housing 402*a*; (d) a ticket cutter 440*a* in and supported by the burster housing 402*a*; (e) a plurality of ticket engagers 450*a* supported by the burster housing 402*a*; and (f) a burster controller (not shown). The size, shape, and configuration of the ticket burster can vary in accordance with the present disclosure.

More specifically, the burster housing 402*a* generally includes a top member (not labeled), spaced-apart side members (not labeled), a front member (not labeled), a rear member (not labeled), and a bottom member (not labeled). The burster housing 402*a* also includes a plurality of internal members (not individually labeled) that define a ticket inlet 422*a*, through which the ticket burster 400*a* is configured to receive a lottery ticket from a ticket drawer of the ticket drawer column 300*a*, a ticket outlet 424*a* through which the ticket burster 400*a* is configured to dispense the received instant lottery ticket into the ticket collection receptacle 250, and a ticket movement path (not labeled) extending from the ticket inlet 422*a* to the ticket outlet 424*a* and through which the lottery ticket is moved through the ticket burster 400*a*.

The ticket cutter 440*a* is positioned in the burster housing 402*a* and configured to rotate to cut the perforations attaching each instant lottery ticket that moves along the ticket movement path in the ticket burster 400*a* to the next instant lottery ticket of the continuous strip of lottery tickets received from the respective ticket drawer. The ticket cutter 440*a* is configured to make such cut along the perforations between the two connected instant lottery tickets of such strip. The ticket cutter 440*a* is controlled by the burster controller and/or the controller of the ticket vending machine 100. In this example embodiment, the ticket cutter 440*a* is inwardly positioned (i.e., positioned downstream) from the ticket inlet 422*a*. After the ticket cutter 440*a* cuts the instant lottery ticket requested by the purchaser from the respective ticket drawer, the ticket drawer can retract the portion of the next instant lottery ticket (of the strip of lottery tickets) from the ticket burster 400*a* before the ticket burster 400*a* moves from the ticket receipt position aligned with that ticket drawer. In other embodiments, the ticket burster 400*a* can be configured such that the ticket cutter is positioned closer to or on the other side of the ticket inlet (i.e., positioned upstream of the ticket inlet) such that after the ticket cutter cuts the lottery ticket along the perforations connecting that lottery ticket to the next lottery ticket in the strip, the ticket drawer may not need to withdraw the next instant lottery ticket in the strip or may only need to withdraw the next instant lottery ticket in the strip a relatively small distance. The position, size, and configuration of the ticket cutter can thus vary in accordance with the present disclosure.

In other embodiments, the ticket burster 400*a* can be configured such that the burster housing 402*a* is rotatable about a horizontal axis to separate (via a tearing and/or twisting motion) each instant lottery ticket along the perforations connecting that instant lottery ticket to the next lottery ticket in the strip. In such embodiments, the ticket drawer may not need to withdraw the next instant lottery ticket of the strip or may only need to withdraw the next instant lottery ticket of the strip a relatively small distance. In such embodiments, the ticket burster may not need a ticket cutter.

The ticket burster 400*a* is configured to burst the perforations between the lottery ticket being dispensed and the next lottery ticket of the strip so as to enable the dispensed lottery ticket to be dispensed into the ticket receptacle 250. This prevents a person from being able to pull an extended number of lottery tickets from one of the ticket packs in one of the ticket drawers. It should be appreciated that the ticket burster 400*a* can be moved to a dispensing location for each instant lottery ticket dispensed, or for only certain of the lottery tickets dispensed. It should also be appreciated that the ticket burster can moved to a different location for any lottery ticket that is deemed to be bad or non-dispensable for any reason, and to deposit that ticket into a suitable rejection area.

The ticket vending machine of the present disclosure can have more than one ticket burster for each ticket drawer column such that they can operate at the same time, or such that one or more ticket bursters are back-ups in case there is an issue with one of the other ticket bursters for that ticket drawer column.

The ticket engagers 450*a* of the burster 400*a* in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The burster controller (not shown) of the burster 400*a* can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a*, and the sensor 430*a* (as further described below). In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the sensor.

In this example embodiment, each of the ticket drawers of each of the ticket drawer columns includes or is associated with: (1) a ticket level determination assembly; and (2) a lottery ticket state indicator. In this example embodiment, the ticket level determination assemblies and the lottery ticket state indicators are identical so only ticket level determination assembly 380 and lottery ticket state indicator 390 are described herein for brevity.

The ticket level determination assembly 380 is configured to at least partially enable a determination or verification by the controller of a burster and/or the controller of the vending machine 100 of the state of the lottery tickets in the ticket drawer that the ticket level determination assembly 380 is associated with.

In this example embodiment, the ticket level determination assembly 380 includes a light beam source (not shown) that is mounted adjacent to the ticket drawer 350 and configured to create a light beam 381 that extends in the directions of the arrows 382 and 383 shown in FIG. 7. The ticket level determination assembly 380 includes a reflector 384 (such as a mirrored member configured to redirect the light beam 381 as shown in FIG. 8). In operation, the light beam source creates the light beams 381 that has a first component 381*a* that travels through the light channel 356*c* and into the lottery ticket holding area A of the ticket drawer 350. The first component 381*a* of the light beam 381 is deflected by the reflector 384 and to create the second component 381*b* of the light beam 381 that travels through the light channel 353*c* and out of the ticket drawer 350. Thus, the light beam 381 is configured to move through the lottery ticket holding area A of the ticket drawer 350 and to the burster 400*a* when the burster 400*a* is aligned with the ticket drawer 350.

The movable ticket burster 400*a* is moveable to a position associated with each of the ticket drawers in the ticket drawer column 300*a* and the sensor 430*a* of the burster 400*a* is configured to sense the light beam 381 from the ticket level determination assembly 380 of each ticket drawer in the ticket drawer column to enable a determination or verification regarding the status of the lottery tickets in that ticket drawer. As mentioned above, the movable ticket burster 400*a* includes a sensor 430*a* as best shown in FIG. 10, and that sensor 430*a* is configured to sense the light beam 381 to enable a determination or verification of lottery tickets in the ticket drawer 350. More specifically, the sensor 430*a* of the ticket burster 400*a* is on the inner lower side of the housing 402*a* and is supported by the housing 402*a* of the ticket burster 400*a*. The sensor 430*a* is configured to be aligned with the light beam channel 353*c* such that it can sense the light beam 381 extending through the light beam channel 353*c*. In this example embodiment, the sensor 430*a* is on one side of the housing 402*a*. In other alternative embodiments that are not shown, the sensor 430*a* can be in another suitable location. The sensor 430*a* is configured to communicate data (regarding the sensed light beam) to the burster controller and/or the controller of the ticket vending machine 100. The burster controller and/or the controller of the ticket vending machine 100 are configured to analyze this data and determine partially determine or verify a state of the lottery tickets in the ticket drawer based on this data. In various embodiments, this data provides information relative to whether lottery tickets are in the ticket drawer.

In this example embodiment, when no lottery tickets are in the ticket drawer 350, the light beam 381 is not blocked by any of the lottery tickets. Thus, when the burster 400*a* is aligned with the ticket drawer 350, the sensor 430*a* of the burster 400*a* can sense the light beam and provide data regarding the sensed the light beam to the controllers of the burster 400*a* and/or the controller of the vending machine 100.

In this example embodiment, when a first small quantity of lottery tickets are in the ticket drawer 350, the light beam 381 is not blocked by such lottery tickets that are in the ticket drawer 350. Thus, when the burster 400*a* is aligned with the ticket drawer 350, the sensor 430*a* of the burster can sense the light beam and provide data regarding the sensed the light beam to the controllers of the burster 400*a* and/or the controller of the vending machine 100.

In this example embodiment, when a larger quantity of lottery tickets are in the ticket drawer 350, the light beam 381 is blocked by such lottery tickets that are in the ticket drawer 350. Thus, when the burster 400*a* is aligned with the ticket drawer, the sensor 430*a* of the burster does not sense the light beam and can provide data regarding the light beam not being sensed to the controllers of the burster 400*a* and/or the controller of the vending machine 100. It should be appreciated that if the light beam 381 is blocked, this can indicate that one or more packs of lottery tickets are in the ticket drawer.

In one such example, the controller of the vending machine 100 can track, for each ticket drawer, the lottery tickets dispensed from a known ticket pack in that ticket drawer. If an operator attached (such as using tape) a second ticket pack to the known ticket pack in the ticket drawer, and the controller does not know this (such as because the operator did not input information regarding this second pack for the controller know about this second pack), the signals received from the sensor can inform the controller that more tickets than expected are in the ticket drawer. The controller can act appropriately including requesting more information from the operator or expecting different tickets to be in that ticket drawer. The controller can cause the respective lottery ticket state indicator to indicate this.

In each such case, the sensor 430*a* can provide signals that represent data to the controller(s), wherein the data represents certain information for the controllers of the burster and/or the vending machine to use to enable such controller(s) to determine or verify the state of the lottery tickets in such ticket drawer 350.

In various embodiments, the controller(s) is/are configured to use this data to partially determine or verify the lottery ticket state for each of a plurality of ticket drawers of the lottery ticket vending machine 100, and to provide indications of the lottery ticket state for each of the ticket drawers of the lottery ticket vending machine 100.

In various embodiments, the controller(s) are configured to cause a lottery ticket state indicator associated with each ticket drawer to display an indication of the lottery ticket state for such ticket drawer.

Figure 6A:
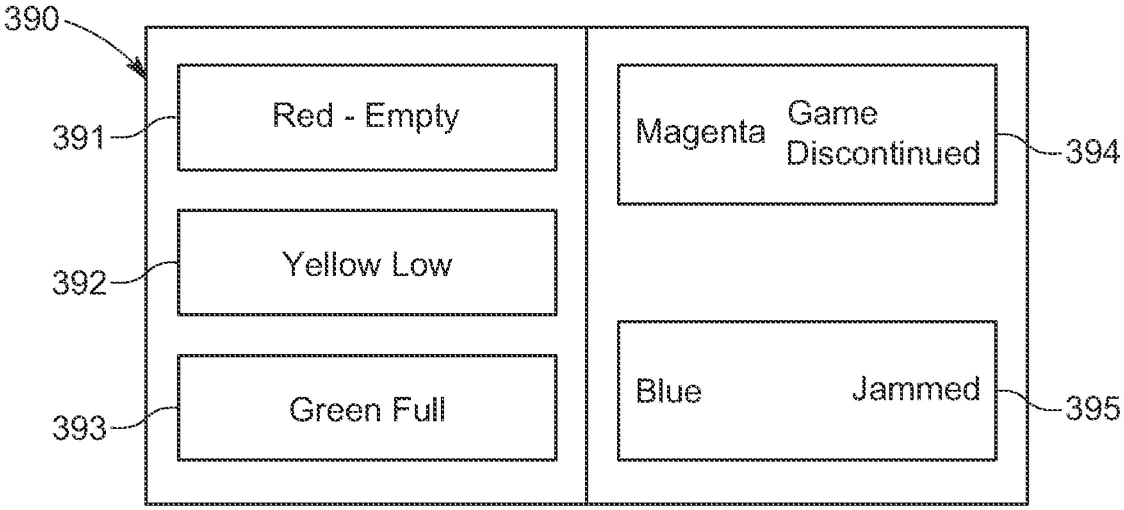
FIG. 6A is an enlarged front view of part of the ticket drawer of FIG. 6 and showing the lottery ticket state indicator of that ticket drawer in accordance with one example embodiment of the present disclosure.

FIGS. 6 and 6A show an example lottery ticket state indicator for the lottery ticket drawer 350. For ease of explanation, the ticket state indicator 390 for the ticket drawer 350 in this example embodiment is mounted on the front wall 353 of the ticket drawer 350. In other embodiments, the ticket state indicator can alternatively be mounted on a structure adjacent to the ticket drawer 350. In other embodiments, the ticket state indicator can alternatively or additionally be displayed by a display device of the lottery ticket vending machine 100 such as explained below with respect to FIG. 11. In this example embodiment, the lottery ticket state indicator 390 in positioned on the ticket drawer 350. This example lottery ticket state indicator 390 is suitably communicatively connected to one of the controllers. This example lottery ticket state indicator 390 includes a plurality of state indicators including: (1) an empty state indicator 391; (2) a low state indicator 392; (3) a full state indicator 393; (4) a lottery game discontinued indicator 394; and (5) a jammed state indicator 395. The empty state indicator 391, when illuminated, indicates that the ticket drawer 350 is empty. The low state indicator 392, when illuminated, indicates that the ticket drawer 350 is low or close to empty. The full state indicator 393, when illuminated, indicates that the ticket drawer 350 is full. The lottery game discontinued indicator 394, when illuminated, indicates that the lottery game that is associated with the lottery tickets in the ticket drawer 350 has been discontinued. The jammed state indicator 395, when illuminated, indicates that there is a jam in the ticket drawer 350. In various embodiments, the controller can cause one or more of the indicators to blink to better catch the eye of an operator or for other purposes. This lottery ticket state indicator 390 thus indicates to an operator of the vending machine 100 information regarding the ticket state for each of the respective ticket drawers of the vending machine 100. This enables the operator to more quickly spot, determine, and address any issues such as jammed ticket drawers (that need to be fixed), ticket drawers that are empty or close to being empty (i.e., low) and thus need to be refilled, and ticket drawers that have lottery tickets that are discontinued (and thus have to be replaced).

In this example embodiment, this example lottery ticket state indicator 390 includes five separate illuminable state indicators 391, 392, 393, 394, and 395 (such as LED lights) that indicate information to the operator of the vending machine under the control of one of the controller(s). In alternative embodiments, the lottery ticket vending machine includes only one lottery ticket state indicator (such as one LED light) for each ticket drawer that is configured to indicate each of the different lottery ticket states such as the example lottery ticket states described above (e.g., empty, low, full, discontinued, and jammed).

In this example embodiment, this example lottery ticket state indicator 390 is mounted on the lottery ticket drawer 350. In other example embodiments, the lottery ticket state indicators for each of the ticket drawers is mounted adjacent to the drawer such as on a support for the ticket drawer. For example, one or more lottery ticket state indicators for each ticket drawer of a column can be supported by a support (such as but not limited to a support for the ticket drawer) adjacent to that ticket drawer.

In various further alternative embodiments, the lottery ticket vending machine includes multiple lottery ticket state indicators that are respectively configured to display the lottery ticket states for each of the ticket drawers of each of the drawer columns such as a separate lottery ticket state indicator for each drawer column. In such example, the controller(s) can cause the states of the ticket drawers in a ticket drawer column to be indicated sequentially and/or at the request of an operator.

In various further alternative embodiments, the lottery ticket vending machine includes the lottery ticket state indicators on each of the bursters associated with the ticket drawers and/or ticket drawer columns. In such case, when a burster is aligned with a ticket drawer, the burster will cause the lottery ticket state indicators of that burster to display the lottery ticket state for that ticket drawer.

In various further alternative embodiments, the lottery ticket vending machine includes the lottery ticket state indicators for each of the ticket drawers on one or more display devices that are separate from the lottery ticket drawers and ticket drawer columns. For example, FIG. 11 shows an interface displayed by the display device 180 of the vending machine 100. This interface displays, for each ticket drawer of the first ticket column, an indicator of the ticket drawer (e.g., the numbers 1 to 16), and an indicator of the ticket state for that ticket drawer (e.g., empty, low, full, discontinued, or jammed). In this example, the interface displays the information for one of the ticket drawer columns and can enable the operator to switch the drawer column for which the ticket state information is displayed (such as via a suitable input device). In other embodiments, the interface can display the information for each of the ticket drawers for multiple ticket drawer columns, or each of the ticket drawers for all of the ticket drawer columns.

In various embodiments, the lottery ticket vending machine includes an operator interface (not shown) that enables the operator to enter information for each ticket drawer corresponding to the lottery tickets placed in that ticket drawer. This can include lottery game information, lottery ticket pack information, quantity of pack information, and/or quantity of ticket information. The controller can also receive certain information from one or more automatic loading, automatic checking, or other similar processes.

The controller of the vending machine 100 uses this information to track the quantity of tickets that should be in each ticket drawer. The controller further tracks the quantity of tickets that should be in each ticket drawer based on the quantity of lottery tickets dispensed from that ticket drawer by the vending machine 100. The controller can use the information obtained from the sensors of the bursters as described above to verify such ticket count information. The controller can also use other information (such as when a lottery game is discontinued such as due to the top award being won) received from an operator or a central lottery system. The controller can then use such information to control the ticket state indicator for each lottery ticket drawer such as described above. In various embodiments, the controller(s) of the lottery ticket vending machine tracks: (1) the quantity of tickets in each ticket drawer; (2) the lottery games of the lottery tickets in each for relevant lottery ticket events (such as a discontinuation of a lottery game); and (3) any other events (such as jams) associated with each of the ticket drawers, and controls the lottery ticket state indicators for each ticket drawer based on such information. Additionally, in various embodiments, the controller(s) is configured to receive and use data from sensors that provide information regarding the lottery tickets in each of the lottery ticket drawers to determine and/or verify the lottery ticket state for each lottery ticket drawer.

The controller of the ticket vending machine 100 can be additionally configured to take one or more actions based on the determined quantity of lottery tickets in each ticket drawer. In certain instances, the controller of the ticket vending machine 100 does not need to take any action. In other instances, the controller of the ticket vending machine 100 can take one or more of a series of different actions based on the quantities. In various different embodiments, the respective action taken can vary and can be any one or more of the following example actions: (1) cause a display of a message on a display device of the vending machine 100 to alert an operator of the vending machine 100 regarding the quantity of lottery tickets in a ticket drawer to enable the operator to act on such quantity; and/or (2) send a message to a remote monitoring device separate from the vending machine regarding the quantity to enable an operator to act on such issue.

It should be appreciated that each of the ticket level determination assemblies can be otherwise suitably formed to determine a more specific ticket count in each of the ticket drawers.

In one example embodiment, the lottery ticket state for a lottery ticket drawer can be determined by the controller based on the following example information: (1) the lottery ticket pack has a total minimum pack thickness of 0.20 inches (0.508 cms) and includes 15 lottery tickets; and (2) the lottery ticket pack has a total maximum pack thickness of 1.60 inches (4.064 cms) and includes 200 lottery tickets. In this example, the sensor of the burster can measure total bin pack thickness above 0.1575 inches (0.40005 cms) and thus provide such information to the controller to enable the controller to determine and/or verify the quantity of lottery tickets in a ticket drawer.

It should be appreciated from the above that various embodiments of the present disclosure provide a lottery ticket vending machine comprising: a housing; a plurality of ticket drawers in the housing, the ticket drawers each configured to hold lottery tickets; a ticket burster in the housing, the ticket burster defining a ticket inlet and a ticket outlet, the ticket burster movable to positions respectively associated with the ticket drawers; and a controller configured to: for each of the ticket drawers, track a quantity of lottery tickets in that ticket drawer, for each of the ticket drawers, track an event associated with the lottery tickets in that ticket drawer, and for each of the ticket drawers, cause a display by a lottery ticket state indicator of an indication of a lottery ticket state for that ticket drawer. In various such embodiments, the lottery ticket vending machine comprises a display device supported by the housing, and wherein the lottery ticket state indicator for each of the ticket drawers comprises an interface displayable by the display device. In various such embodiments, the interface is configured to display, for each ticket drawer, an empty lottery ticket state indicator, a low lottery ticket state indicator, a full lottery ticket state indicator, a discontinued lottery ticket state indicator, and a jammed lottery ticket state indicator. In various such embodiments, the lottery ticket vending machine which comprises a separate lottery ticket state indicator for each ticket drawer. In various such embodiments, the lottery ticket vending machine comprises a separate lottery ticket state indicator for each ticket drawer, and where for each ticket drawer, the lottery ticket state indicator for that ticket drawer is connected to that ticket drawer. In various such embodiments, the lottery ticket vending machine comprises a separate lottery ticket state indicator for each ticket drawer, and where for each ticket drawer, the lottery ticket state indicator for that ticket drawer is adjacent to that ticket drawer. In various such embodiments, the lottery ticket vending machine comprises a separate lottery ticket state indicator for each ticket drawer, and where for each ticket drawer, the lottery ticket state indicator for that ticket drawer mounted to a support adjacent to that ticket drawer. In various such embodiments, the lottery ticket vending machine comprises a separate lottery ticket state indicator for each ticket drawer, and where for each ticket drawer, the lottery ticket state indicator for that ticket drawer mounted to a support that supports that ticket drawer. In various such embodiments, the lottery ticket vending machine comprises a separate lottery ticket state indicator for each ticket drawer, and where for each ticket drawer, the lottery ticket state indicator for that ticket drawer mounted to a support that supports the ticket burster. In various such embodiments, the lottery ticket vending machine comprises a display device supported by the housing, and wherein the lottery ticket state indicator for each of the ticket drawers is displayable by the display device. In various such embodiments, wherein the event comprises a discontinuation of a draw lottery game associated with the lottery tickets in one of the ticket drawers. In various such embodiments, wherein the event comprises a jam in one of the ticket drawers. In various such embodiments, wherein the controller is configured to receive and use signals from a sensor regarding amounts of lottery tickets in the ticket drawers.

It should further be appreciated from the above that various embodiments of the present disclosure provide a lottery ticket vending machine comprising: a housing; a display device supported by the housing; a plurality of ticket drawers in the housing, the ticket drawers each configured to hold lottery tickets; a ticket burster in the housing, the ticket burster defining a ticket inlet and a ticket outlet, the ticket burster movable to positions respectively associated with the ticket drawers; and a controller configured to: for each of the ticket drawers, track a quantity of lottery tickets in that ticket drawer, for each of the ticket drawers, track an event associated with the lottery tickets in that ticket drawer, and for each of the ticket drawers, cause a display, by the display device, of an indication of a lottery ticket state for that ticket drawer. In various such embodiments, wherein the display, for each ticket drawer, comprises one of an empty lottery ticket state indication, a low lottery ticket state indication, a full lottery ticket state indication, a discontinued lottery ticket state indication, and a jammed lottery ticket state indication. In various such embodiments, wherein the event comprises a discontinuation of a draw lottery game associated with the lottery tickets in one of the ticket drawers. In various such embodiments, wherein the event comprises a jam in one of the ticket drawers. In various such embodiments, wherein the controller is configured to receive and use signals from a sensor regarding amounts of lottery tickets in the ticket drawers.

It should further be appreciated from the above that various embodiments of the present disclosure provide a lottery ticket vending machine comprising: a housing; a display device supported by the housing; a plurality of ticket drawers in the housing, the ticket drawers each configured to hold lottery tickets; a ticket burster in the housing, the ticket burster defining a ticket inlet and a ticket outlet, the ticket burster movable to positions respectively associated with the ticket drawers; and a controller configured to: for each of the ticket drawers, receive data regarding a quantity of lottery tickets in that ticket drawer, and for each of the ticket drawers, cause a display, by the display device, of one of an empty lottery ticket state indication, a low lottery ticket state indication, a full lottery ticket state indication, a discontinued lottery ticket state indication, and a jammed lottery ticket state indication. In various such embodiments, the controller is configured to receive and use signals from a sensor regarding amounts of lottery tickets in the ticket drawers.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:
a housing;
a plurality of ticket drawers in the housing, the ticket drawers each configured to hold lottery tickets;
a ticket burster in the housing, the ticket burster comprising a sensor and defining a ticket inlet and a ticket outlet, the ticket burster movable to positions respectively associated with each of the ticket drawers; and
a controller supported by the housing and configured to, for each of the ticket drawers:
receive and use signals from the sensor regarding an amount of lottery tickets in the ticket drawer when the ticket burster is aligned with the ticket drawer,
track a quantity of lottery tickets in the ticket drawer,
track an event associated with the lottery tickets in the ticket drawer, and
cause a display by a lottery ticket state indicator of an indication of a lottery ticket state for the ticket drawer based on any tracked events associated with the lottery tickets in the ticket drawer and any signals from the sensor regarding the amount of lottery tickets in the ticket drawer when the ticket burster is aligned with the ticket drawer.

2. The lottery ticket vending machine of claim 1, which comprises a display device supported by the housing, and wherein the lottery ticket state indicator for each of the ticket drawers comprises an interface displayable by the display device.

3. The lottery ticket vending machine of claim 2, wherein the interface is configured to display, for each ticket drawer, an empty lottery ticket state indicator, a low lottery ticket state indicator, a full lottery ticket state indicator, a discontinued lottery ticket state indicator, and a jammed lottery ticket state indicator.

4. The lottery ticket vending machine of claim 1, which comprises a separate lottery ticket state indicator for each ticket drawer.

5. The lottery ticket vending machine of claim 1, which comprises a separate lottery ticket state indicator for each ticket drawer, and where for each ticket drawer, the lottery ticket state indicator for that ticket drawer is connected to that ticket drawer.

6. The lottery ticket vending machine of claim 1, which comprises a separate lottery ticket state indicator for each ticket drawer, and where for each ticket drawer, the lottery ticket state indicator for that ticket drawer is adjacent to that ticket drawer.

7. The lottery ticket vending machine of claim 1, which comprises a separate lottery ticket state indicator for each ticket drawer, and where for each ticket drawer, the lottery ticket state indicator for that ticket drawer mounted to a support adjacent to that ticket drawer.

8. The lottery ticket vending machine of claim 1, which comprises a separate lottery ticket state indicator for each ticket drawer, and where for each ticket drawer, the lottery ticket state indicator for that ticket drawer mounted to a support that supports that ticket drawer.

9. The lottery ticket vending machine of claim 1, which comprises a separate lottery ticket state indicator for each ticket drawer, and where for each ticket drawer, the lottery ticket state indicator for that ticket drawer is mounted to a support that supports the ticket burster.

10. The lottery ticket vending machine of claim 1, which comprises a display device supported by the housing, and wherein the lottery ticket state indicator for each of the ticket drawers is displayable by the display device.

11. The lottery ticket vending machine of claim 1, wherein the event comprises a discontinuation of a draw lottery game associated with the lottery tickets in one of the ticket drawers.

12. The lottery ticket vending machine of claim 1, wherein the event comprises a jam in one of the ticket drawers.

13. The lottery ticket vending machine of claim 1, wherein:

the sensor is configured to, for each ticket drawer, sense a light beam that is directed to move through a lottery ticket holding area of the ticket drawer when the ticket burster is aligned with the ticket drawer, and the sensor sends signals regarding an amounts of lottery tickets in the ticket drawers to the controller based on whether the light beam is sensed.

14. A lottery ticket vending machine comprising:

a housing;

a display device supported by the housing;

a plurality of ticket drawers in the housing, each ticket drawer comprising a lottery ticket holding area configured to hold lottery tickets, each ticket drawer associated with a ticket level determination assembly configured to direct a light beam into the lottery ticket holding area of the ticket drawer;

a ticket burster in the housing, the ticket burster defining a ticket inlet and a ticket outlet, the ticket burster movable to positions respectively associated with the ticket drawers; and a controller supported by the housing and configured to, for each of the ticket drawers:

receive and use signals regarding an amount of lottery tickets in the ticket drawer when the ticket burster is aligned with the ticket drawer, wherein the signals are based on whether the light beam is blocked by lottery tickets within the lottery ticket holding area of the ticket drawer, track a quantity of lottery tickets in the ticket drawer, track an event associated with the lottery tickets in the ticket drawer, and cause a display, by the display device, of an indication of a lottery ticket state for the ticket drawer based on any tracked events associated with the lottery tickets in the ticket drawer and any signals regarding the amount of lottery tickets in the ticket drawer.

15. The lottery ticket vending machine of claim 14, wherein the display, for each ticket drawer, comprises one of an empty lottery ticket state indication, a low lottery ticket state indication, a full lottery ticket state indication, a discontinued lottery ticket state indication, and a jammed lottery ticket state indication.

16. The lottery ticket vending machine of claim 15, wherein the event comprises a discontinuation of a draw lottery game associated with the lottery tickets in one of the ticket drawers.

17. The lottery ticket vending machine of claim 15, wherein the event comprises a jam in one of the ticket drawers.

18. The lottery ticket vending machine of claim 14, wherein the ticket level determination assembly associated with each ticket drawer comprises a light beam source that creates the light beam for the ticket drawer and a reflector that deflects the light beam for the ticket drawer out of the ticket drawer after the light beam for that ticket drawer has moved through the lottery ticket holding area of the ticket drawer.

19. A lottery ticket vending machine comprising:

a housing;

a display device supported by the housing;

a plurality of ticket drawers in the housing, each ticket drawer comprising a lottery ticket holding area configured to hold lottery tickets;

a ticket burster in the housing, the ticket burster comprising a sensor and defining a ticket inlet and a ticket outlet, the ticket burster movable to positions respectively associated with the ticket drawers, the sensor configured to, for each of the ticket drawers, provide data regarding a quantity of lottery tickets in the lottery ticket holding area of the ticket drawer when the ticket burster is aligned with the ticket drawer; and a controller supported by the housing and configured to:

for each of the ticket drawers, receive the data regarding the quantity of lottery tickets in the lottery ticket holding area of the ticket drawer, and for each of the ticket drawers, cause a display, by the display device, of one of an empty lottery ticket state indication, a low lottery ticket state indication, a full lottery ticket state indication, a discontinued lottery ticket state indication, and a jammed lottery ticket state indication determined at least partially based on the received data.

20. The lottery ticket vending machine of claim 19, wherein the controller is configured to receive and use signals from the sensor regarding the quantities of lottery tickets in the ticket drawers.

* * * * *